US012472616B2

(12) United States Patent
Nick et al.

(10) Patent No.: US 12,472,616 B2
(45) Date of Patent: Nov. 18, 2025

(54) ROTARY IMPACT TOOL WITH THRUST BEARING

(71) Applicant: MILWAUKEE ELECTRIC TOOL CORPORATION, Brookfield, WI (US)

(72) Inventors: Mackenzie J. Nick, Theresa, WI (US); Peter J. Davies, Milwaukee, WI (US); Evan Brown, Milwaukee, WI (US); Joseph T. Lottes, Sussex, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 18/602,941

(22) Filed: Mar. 12, 2024

(65) Prior Publication Data

US 2024/0308046 A1 Sep. 19, 2024

Related U.S. Application Data

(60) Provisional application No. 63/489,932, filed on Mar. 13, 2023.

(51) Int. Cl.
*B25B 21/02* (2006.01)
*B25B 23/16* (2006.01)
(Continued)

(52) U.S. Cl.
CPC .............. *B25F 5/001* (2013.01); *B25B 21/02* (2013.01); *B25B 21/026* (2013.01); *B25B 23/16* (2013.01); *B25D 11/066* (2013.01); *B25F 5/02* (2013.01)

(58) Field of Classification Search
CPC ..... B25B 21/02; B25B 21/026; B25B 21/004; B25B 21/008; B25B 23/02; B25B 23/16;
(Continued)

(56) References Cited

U.S. PATENT DOCUMENTS 3,433,082 A 3/1969 Bitter et al.
3,837,410 A 9/1974 Maxwell
(Continued)

FOREIGN PATENT DOCUMENTS

CN 206952926 U 2/2018
CN 210452536 U 5/2020
(Continued)

OTHER PUBLICATIONS

Extended European Search Report for Application No. 24162819.7 dated Nov. 11, 2024 (10 pages).

*Primary Examiner* — Scott A Smith
(74) *Attorney, Agent, or Firm* — Michael Best & Friedrich LLP

(57) ABSTRACT

A rotary impact tool including a housing, a motor, a gear assembly, and a drive assembly. The motor includes a shaft configured to rotate about an axis. The gear assembly is operably coupled to the motor. The drive assembly is configured to convert continuous torque received from the shaft through the gear assembly into periodic rotational impacts upon a workpiece. The drive assembly includes a camshaft, an anvil, a hammer, and a thrust bearing. The camshaft is operably coupled to the gear assembly. The anvil is positioned adjacent to a forward end of the camshaft. The hammer is configured to reciprocate along the camshaft to impart rotational impacts to the anvil in response to rotation of the camshaft. The thrust bearing is engaged with the camshaft such that the thrust bearing is configured to at least partially support the camshaft in an axial direction.

20 Claims, 7 Drawing Sheets

(51) Int. Cl.

| | |
|---|---|
| ***B25F 5/00*** | (2006.01) |
| *B25D 11/06* | (2006.01) |
| *B25F 5/02* | (2006.01) |

(58) Field of Classification Search

CPC ........ B25B 23/1475; B25F 5/001; B25F 5/02; B25F 5/021; B25D 11/066

USPC .......... 173/93, 93.5, 104, 109, 48, 216, 122, 173/205, 128, 217

See application file for complete search history.

(56) References Cited

U.S. PATENT DOCUMENTS

| | | | |
|---|---|---|---|
| 3,848,680 | A | 11/1974 | Legler |
| 3,908,768 | A | 9/1975 | Hess |
| 4,895,212 | A | 1/1990 | Wache |
| 6,199,640 | B1 | 3/2001 | Hecht |
| 7,191,848 | B2 | 3/2007 | Ha |
| 7,654,339 | B2 | 2/2010 | Fuchs |
| 8,136,607 | B2 | 3/2012 | Frauhammer et al. |
| 8,281,872 | B2 | 10/2012 | Duesselberg et al. |
| 8,631,880 | B2 | 1/2014 | Murthy et al. |
| 9,975,224 | B2 * | 5/2018 | Tanaka .................... B25B 21/02 |
| 11,484,997 | B2 * | 11/2022 | Schneider ............. B25B 21/026 |
| 2007/0181321 | A1 | 8/2007 | Ha et al. |
| 2009/0025951 | A1 | 1/2009 | Frauhammer et al. |
| 2009/0145618 | A1 | 6/2009 | Duesselberg et al. |
| 2010/0000749 | A1 | 1/2010 | Andel |
| 2017/0239801 | A1 * | 8/2017 | Kondo .................... B25B 21/02 |
| 2017/0326720 | A1 * | 11/2017 | Kuroyanagi ............ B25F 5/021 |
| 2019/0030692 | A1 * | 1/2019 | Harada ............... B25B 23/1475 |
| 2019/0255687 | A1 * | 8/2019 | Schneider ............... B25B 21/02 |
| 2020/0009709 | A1 * | 1/2020 | Kumagai ................ B25B 21/02 |
| 2020/0262037 | A1 * | 8/2020 | Schneider ............. B25B 21/026 |
| 2021/0053201 | A1 | 2/2021 | Mandal et al. |
| 2021/0291329 | A1 | 9/2021 | Straub et al. |

FOREIGN PATENT DOCUMENTS

| | | | |
|---|---|---|---|
| DE | 880280 | C | 6/1953 |
| DE | 2029614 | A1 | 12/1971 |
| DE | 2029613 | A1 | 2/1972 |
| DE | 4218816 | A1 | 12/1993 |
| DE | 102017101948 | A1 | 8/2018 |
| DE | 102018130309 | A1 | 6/2019 |
| EP | 0808695 | A2 | 11/1997 |
| EP | 1614507 | A2 | 1/2006 |
| EP | 2314420 | A1 | 4/2011 |
| WO | 2011003646 | A1 | 1/2011 |

* cited by examiner

ROTARY IMPACT TOOL WITH THRUST BEARING

CROSS-REFERENCE TO RELATED APPLICATION

This application claims priority to U.S. Provisional Patent Application No. 63/489,932 filed on Mar. 13, 2023, the entire contents of which are incorporated herein by reference.

FIELD

The present disclosure relates to power tools, and more particularly to rotary impact tools, such as impact wrenches.

BACKGROUND

Rotary impact tools are typically utilized to provide a striking rotational force, or intermittent applications of torque, to a tool element or workpiece (e.g., a fastener) to either tighten or loosen the fastener.

SUMMARY

In some aspects, the techniques described herein relate to a rotary impact tool including: a housing; a motor supported within the housing, the motor including a shaft configured to rotate about an axis; a gear assembly operably coupled to the motor, the gear assembly including a ring gear fixed relative to the housing and a plurality of planet gears meshed with the ring gear; a drive assembly configured to convert continuous torque received from the shaft through the gear assembly into periodic rotational impacts upon a workpiece, the drive assembly including a camshaft operably coupled to the gear assembly, an anvil positioned adjacent to a forward end of the camshaft, and a hammer configured to reciprocate along the camshaft to impart periodic rotational impacts to the anvil in response to rotation of the camshaft; and a thrust bearing engaged with the camshaft such that the thrust bearing is configured to at least partially support the camshaft in an axial direction.

In some aspects, the techniques described herein relate to a rotary impact tool, wherein the camshaft includes a rear end, and wherein the thrust bearing is engaged with the camshaft at the rear end of the camshaft.

In some aspects, the techniques described herein relate to a rotary impact tool, wherein the thrust bearing is disposed along the axis between the ring gear and the camshaft.

In some aspects, the techniques described herein relate to a rotary impact tool, wherein the thrust bearing is supported within the ring gear against a rear wall of the ring gear.

In some aspects, the techniques described herein relate to a rotary impact tool, wherein the thrust bearing includes a first face, a second face, and a plurality of rollers disposed between the first face and the second face.

In some aspects, the techniques described herein relate to a rotary impact tool, wherein the shaft includes a helical pinion that engages the planet gears and is configured to produce a thrust load on the camshaft, and wherein the thrust bearing is configured to support the camshaft against the thrust load.

In some aspects, the techniques described herein relate to a rotary impact tool, wherein the camshaft includes a carrier portion that supports the plurality of planet gears between opposing face plates, and wherein the thrust bearing is engaged with the camshaft at one of the opposing face plates.

In some aspects, the techniques described herein relate to a rotary impact tool, wherein the one of the opposing face plates is a rearward face plate positioned on a rearward side of the planet gears.

In some aspects, the techniques described herein relate to a rotary impact tool, further including a rear radial bearing and a forward radial bearing rotatably supporting the shaft, wherein the forward radial bearing is supported by the ring gear.

In some aspects, the techniques described herein relate to a rotary impact tool including: a housing; a motor supported within the housing, the motor including a shaft configured to rotate about an axis; a gear assembly operably coupled to the motor, the gear assembly including a ring gear fixed relative to the housing and a plurality of planet gears meshed with the ring gear and rotationally engaged with the shaft such that the motor is configured to drive rotation of the planet gears around the ring gear via the shaft; a camshaft including a carrier portion that supports the planet gears such that the camshaft is configured to rotate with the planet gears about the axis; and a thrust bearing positioned between the camshaft and the ring gear.

In some aspects, the techniques described herein relate to a rotary impact tool, wherein the thrust bearing is positioned between a rear wall of the ring gear and a rear plate of the carrier portion of the camshaft.

In some aspects, the techniques described herein relate to a rotary impact tool, further including a hammer coupled to the camshaft and configured to reciprocate along the camshaft, and wherein the thrust bearing is configured to support the camshaft against axial loads generated due to reciprocation of the hammer.

In some aspects, the techniques described herein relate to a rotary impact tool, wherein the thrust bearing includes a plurality of rollers.

In some aspects, the techniques described herein relate to a rotary impact tool, wherein the shaft extends through the thrust bearing.

In some aspects, the techniques described herein relate to a rotary impact tool including: a housing; a motor supported within the housing, the motor including a shaft configured to rotate about an axis; a gear assembly operably coupled to the motor; and a drive assembly configured to convert continuous torque received from the shaft through the gear assembly into periodic rotational impacts upon a workpiece, the drive assembly including a camshaft operably coupled to the gear assembly, an anvil, a hammer spring, and a hammer configured to reciprocate along the camshaft to impart rotational impacts to the anvil in response to rotation of the camshaft, wherein movement of the hammer produces an axial load on the camshaft; and a thrust bearing supporting the camshaft such that at least a portion of the axial load on the camshaft is transmitted through the thrust bearing.

In some aspects, the techniques described herein relate to a rotary impact tool, wherein the gear assembly includes a ring gear, and wherein the thrust bearing is disposed along the axis between the ring gear and the camshaft.

In some aspects, the techniques described herein relate to a rotary impact tool, wherein the thrust bearing includes a first face, a second face, and a plurality of rollers disposed between the first face and the second face.

In some aspects, the techniques described herein relate to a rotary impact tool, wherein the gear assembly includes a plurality of planet gears at least partially engaged with a portion of the shaft, and wherein the camshaft includes a carrier portion that supports the plurality of planet gears and couples the camshaft for rotation with the plurality of planet gears.

In some aspects, the techniques described herein relate to a rotary impact tool, wherein the carrier portion includes opposing face plates and the plurality of planet gears is positioned between the opposing face plates, wherein an end of the hammer spring engages one of the opposing face plates, and wherein the other of the opposing face plates engages the thrust bearing.

In some aspects, the techniques described herein relate to a rotary impact tool, further including a rear radial bearing and a forward radial bearing rotatably supporting the shaft, wherein the shaft extends through the thrust bearing.

Other aspects of the disclosure will become apparent by consideration of the detailed description and accompanying drawings.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

DETAILED DESCRIPTION

Known impact-type power tools may include a camshaft bearing surrounding the camshaft to radially support the camshaft within a gear case. Specifically, such bearings of typical impact-type power tools include balls contained between inner and outer races such that the bearing must be at least as long or wide as the diameter of the balls. These bearings also require support from bearing retainers, which even further increases a depth or length of the bearing assembly and thus the tool.

The present disclosure provides, among other things, an impact tool with a camshaft axially supported by a thrust bearing. In some embodiments of the present disclosure, the camshaft may be radially supported by planet gears carried by the camshaft and axially supported by the thrust bearing located at a rear end of the camshaft. This may result in an overall length reduction of the impact tool compared to known impact tools as described above, which may also increase a torque-to-length ratio and reduce an overall weight of the impact tool.

Figure 1:
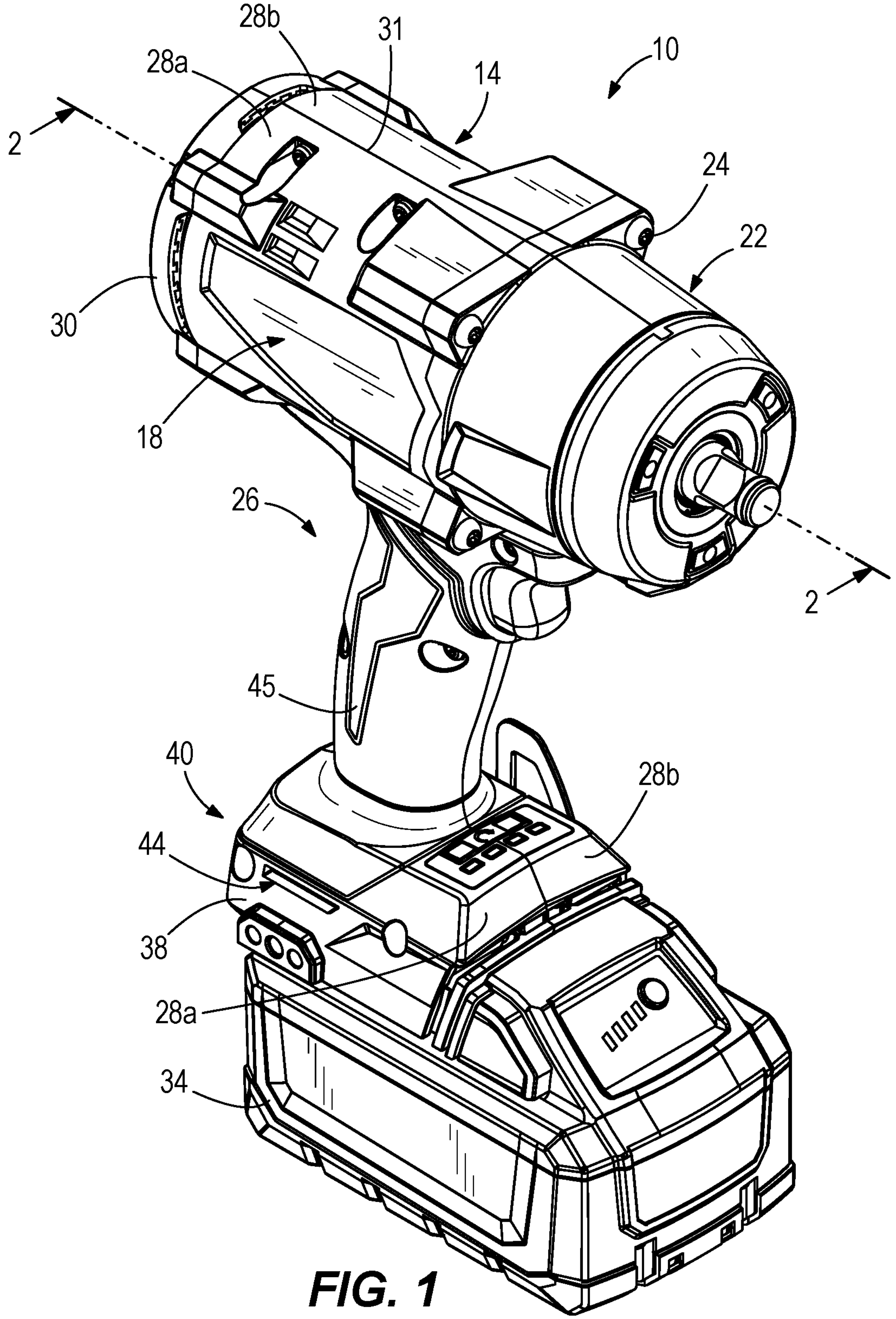
FIG. 1 is a perspective view of an impact tool according to an embodiment of the disclosure.

For example, FIG. 1 illustrates an embodiment of a power tool in the form of a rotary impact tool, and, more specifically, an impact wrench 10. The impact wrench 10 includes a housing 14 with a motor housing portion 18, an impact case or front housing portion 22 coupled to the motor housing portion 18 (e.g., by a plurality of fasteners 24), and a handle portion 26 extending downwardly from the motor housing portion 18. In the illustrated embodiment, the handle portion 26 and the motor housing portion 18 are defined by cooperating first and second clamshell halves or housing portions 28*a*, 28*b*.

The illustrated housing 14 also includes an end cap 30 coupled to the motor housing portion 18 opposite the front housing portion 22. The clamshell halves 28*a*, 28*b* can be coupled (e.g., fastened) together at an interface or seam 31. In the illustrated embodiment, the end cap 30 is continuous and may be pressed or fitted over a rear end of the clamshell halves 28*a*, 28*b*. In other words, the end cap 30 may not include two halves such that the end cap 30 may extend over the seam 31. The end cap 30 is coupled to the motor housing portion 18 by a plurality of fasteners. In other embodiments, the end cap 30 may be integrally formed with the motor housing portion 18.

Referring to FIG. 1, the impact wrench 10 includes a battery 34 removably coupled to a battery receptacle 38 located at a bottom end or foot 40 of the handle portion 26. A motor 42 (FIG. 2) is supported within the motor housing portion 18 and receives power from the battery 34 via connections, pads, and/or battery terminals supported by the battery receptacle 38 when the battery 34 is coupled to the battery receptacle 38. The foot 40 may include, as illustrated in FIG. 1, one or more vents 44 (e.g., air vents, cooling vents, etc.). In the illustrated embodiment, the handle portion 26 of the clamshell halves 28*a*, 28*b* can be covered or surrounded by a grip portion 45.

The battery 34 may be a power tool battery pack generally used to power a power tool, such as an electric drill, an electric saw, and the like (e.g., an 18 volt rechargeable battery pack, or an M18 REDLITHIUM battery pack sold by Milwaukee Electric Tool Corporation). The battery 34 may include lithium ion (Li-ion) cells. In alternate embodiments, the battery packs may be of a different chemistry (e.g., nickel-cadmium (NiCa or NiCad), nickel-hydride, and the like). In the illustrated embodiments, the battery 34 is an 18 volt battery pack. In alternate embodiments, the capacity of the battery 34 may vary (e.g., the battery may be a 4 volt battery pack, a 28 volt battery pack, a 40 volt battery pack, or a battery pack of any other voltage suitable for powering the impact wrench 10.

Figure 2:
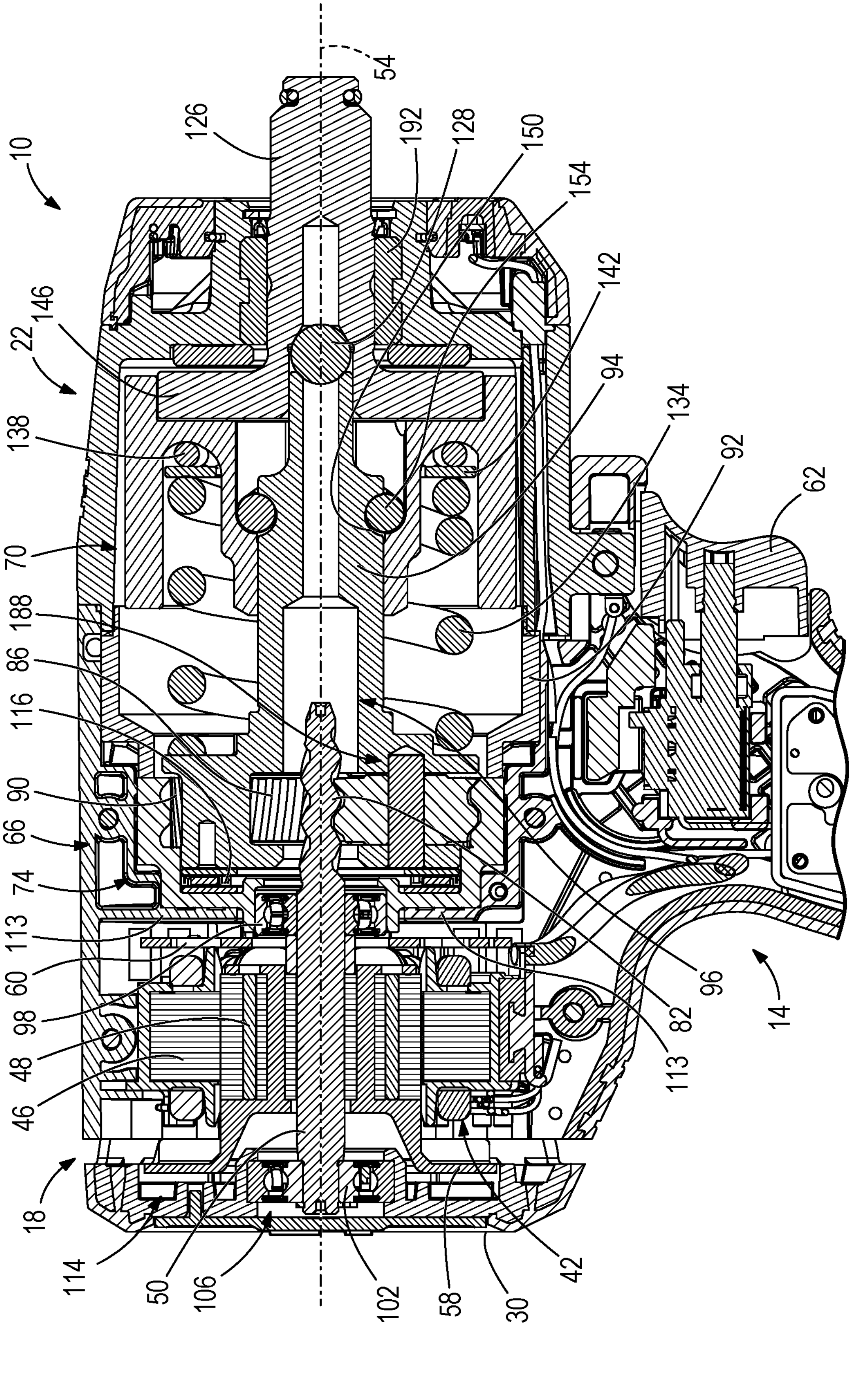
FIG. 2 is a cross-sectional view of the impact tool of FIG. 1 taken along line 2-2.
Figure 3:
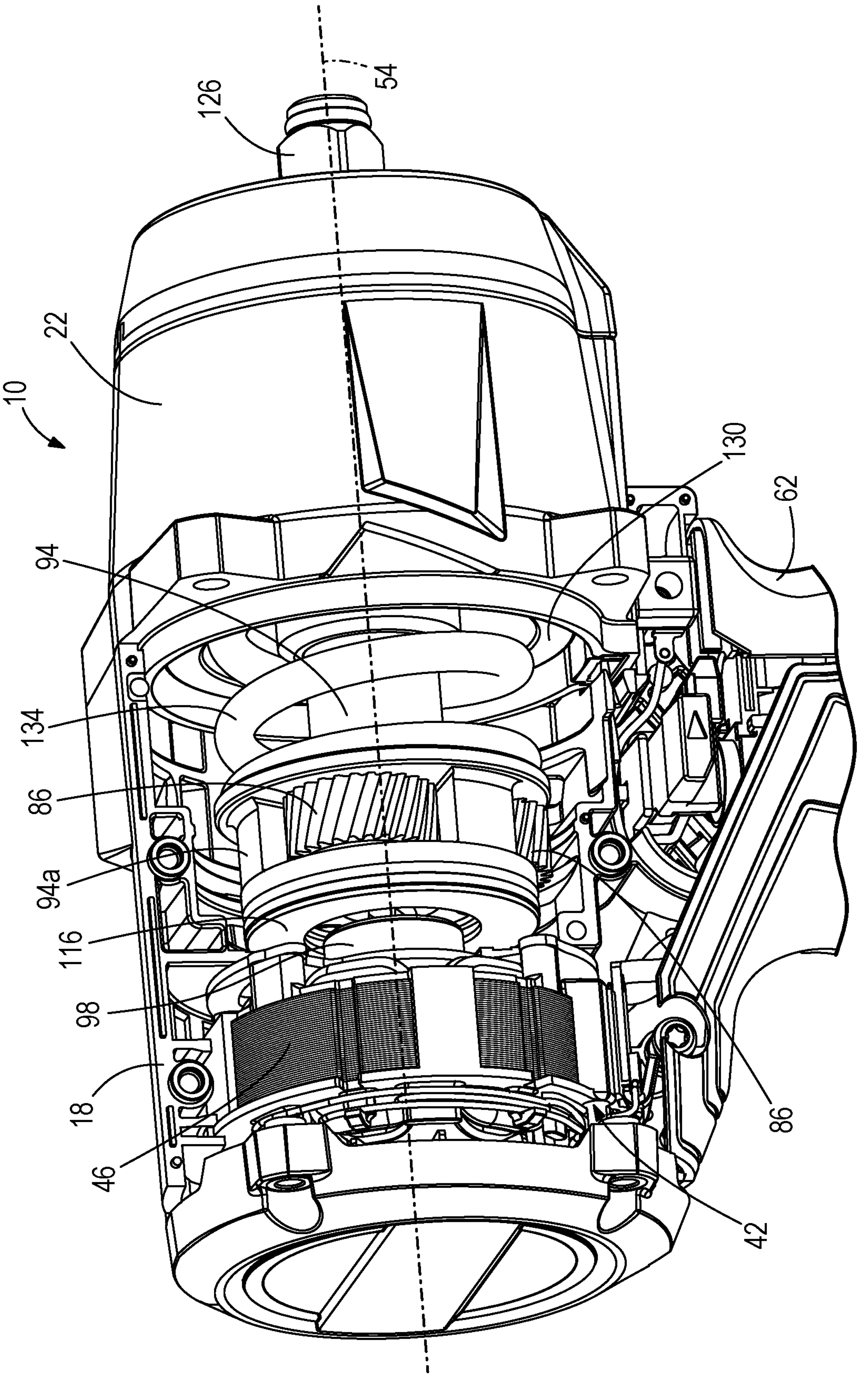
FIG. 3 is a perspective view of the impact tool of FIG. 1 with a first housing portion removed.

With reference to FIGS. 2 and 3, in the illustrated embodiment, the motor 42 is a brushless direct current ("BLDC") motor with a stator 46 and a rotor 48 with an output shaft 50 that is rotatable about an axis 54 relative to the stator 46. In other embodiments, other types of motors may be used. A fan 58 is coupled to the output shaft 50 behind the motor 42 to generate airflow. A printed circuit board assembly ("PCBA") 60 is positioned in front of the motor 42 and may include Hall-Effect sensors to control operation of the motor 42. In some embodiments, the motor 42 may be operable (e.g., controlled) without the use of Hall-Effect sensors. As such, no printed circuit board is needed adjacent the front or back end of the motor 42, allowing for a shorter length required in the housing 14 to accommodate the motor 42 in such embodiments.

The impact wrench 10 also includes a switch 62 (e.g., a trigger switch) supported by the housing 14 that selectively electrically connects the motor 42 (e.g., via suitable control circuitry) and the battery 34 to provide DC power to the motor 42. In other embodiments, the impact wrench 10 may include a power cord for electrically connecting the switch 62 and the motor 42 to a source of AC power. As a further alternative, the impact wrench 10 may be configured to operate using a different power source (e.g., a pneumatic or hydraulic power source, etc.).

With continued reference to FIGS. 2 and 3, the impact wrench 10 further includes a gear assembly 66 driven by the output shaft 50 and an impact mechanism 70 coupled to an output of the gear assembly 66. The impact mechanism 70 may also be referred to herein as a drive assembly 70. The gear assembly 66 may be configured in any of a number of different ways to provide a speed reduction between the output shaft 50 and an input of the drive assembly 70. The gear assembly 66 is at least partially housed within a gear case or gear housing 74 that is formed by the housing 14. As will be described in greater detail below, the gear assembly 66 and gear housing 74 of the impact wrench 10 further reduces an overall length of the impact wrench 10.

Figure 4:
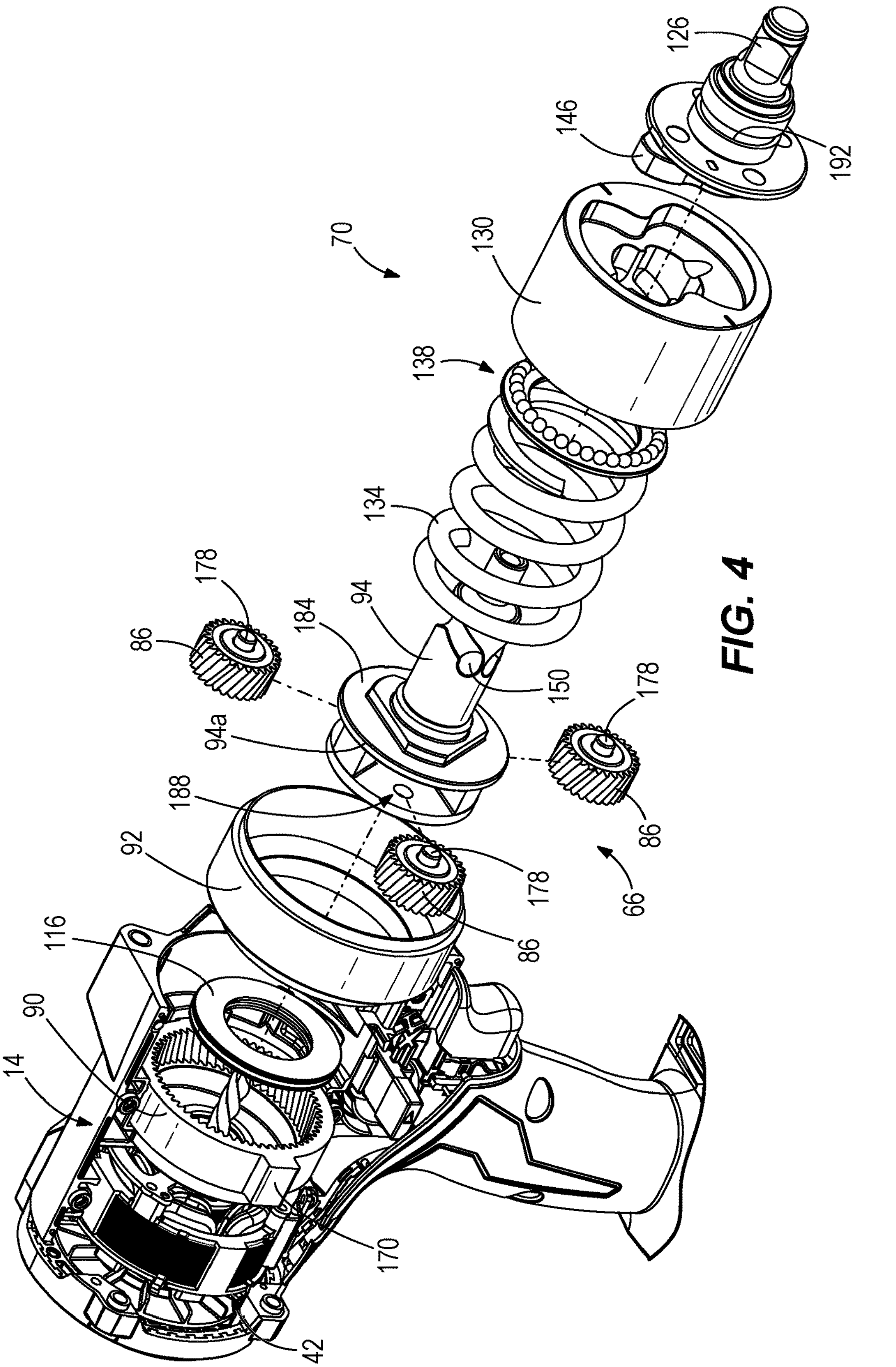
FIG. 4 is a partially exploded view of the impact tool of FIG. 1.

The gear assembly 66 includes a helical pinion 82 formed on the output shaft 50 of the motor 42, a plurality of helical planet gears 86 meshed with the helical pinion 82, and a helical ring gear 90 meshed with the planet gears 86 and rotationally fixed within the housing 14 (e.g., gear housing 74). More specifically, the illustrated ring gear 90 includes a plurality of lugs 170 (FIG. 4). In the illustrated embodiment, the lugs 170 of the ring gear 90 fit within a groove formed by the clamshell halves 28*a*, 28*b* to support and constrain the ring gear 90 in a rotational direction. A rearward facing side of the ring gear 90 is seated against a dividing wall 113 formed by the clamshell halves 28*a*, 28*b*. The dividing wall 113 separates the gear housing 74 from the motor 42. A forward facing side of the ring gear 90 is seated against an intermediate housing case 92. The intermediate housing case 92 is disposed between the front housing portion 22 and the ring gear 90. As such, the intermediate housing case 92 may axially secure the ring gear 90 within the housing 14 of the impact wrench 10. In the illustrated embodiment, the intermediate housing case 92 is cup-shaped and is formed of plastic. In other embodiments, the intermediate housing case 92 may have other shapes and/or may be formed of different materials.

With reference to FIGS. 3 and 4, the planet gears 86 are coupled to a camshaft 94 of the drive assembly 70 such that the camshaft 94 acts as a planet carrier. Specifically, the camshaft 94 includes a carrier portion 94*a* that receives planet gears 86. Accordingly, rotation of the output shaft 50 rotates the planet gears 86, which then advance along the inner circumference of the ring gear 90 and thereby rotate the camshaft 94. In the illustrated embodiment, the camshaft 94 includes a through-hole 96 extending through the camshaft 94 along the axis 54 (FIG. 3). The through-hole 96 is shaped to accommodate and/or receive at least a portion of the helical pinion 82. In the illustrated embodiment, the through-hole 96 extends through the entire length of the camshaft 94, which reduces the weight of the camshaft 94; however, the through-hole 96 may extend only partially through the camshaft 94 in other embodiments.

Referring to FIGS. 2 and 3, the output shaft 50 is rotatably supported by a first or forward bearing 98 and a second or rear bearing 102. The bearings 98, 102 are radial bearings in the illustrated embodiment. The output shaft 50 extends through an opening in the dividing wall 113. The helical-type gears/pinions 82, 86, 90 of the gear assembly 66 may advantageously provide higher torque capacity and quieter operation than spur gears, for example, but the helical engagement between the helical pinion 82 and the planet gears 86 produces an axial thrust load on the output shaft 50. Accordingly, the impact wrench 10 includes a hub or bearing retainer 106, integrally formed by the end cap 30, which secures the rear bearing 102 both axially (e.g., against forces transmitted along the axis 54) and radially (i.e. against forces transmitted in a radial direction of the output shaft 50).

With reference to FIG. 3, the fan 58 includes a frusto-conical recess 114 and the bearing retainer 106 extends into the frusto-conical recess 114 such that at least a portion of the bearing retainer 106 and at least a portion of the rear bearing 102 overlap the fan 58 along the axis 54. This overlapping arrangement advantageously reduces the axial length of the impact wrench 10.

The drive assembly 70 of the impact wrench 10 will now be described with reference to FIGS. 2 and 3. The drive assembly 70 includes an anvil 126, extending from the front housing portion 22, to which a tool element (not shown) can be coupled for performing work on a workpiece (e.g., a fastener). The drive assembly 70 is configured to convert the constant rotational force or torque provided by the gear assembly 66 to a striking rotational force or intermittent applications of torque to the anvil 126 when the reaction torque on the anvil 126 (e.g., due to engagement between the tool element and a fastener being worked upon) exceeds a certain threshold. In the illustrated embodiment of the impact wrench 10, the drive assembly 70 includes the camshaft 94, a hammer 130 supported on and axially slidable relative to the camshaft 94, and the anvil 126. Stated another way, the hammer 130 is configured to reciprocate axially along the camshaft 94 to impart periodic rotational impacts to the anvil 126 in response to rotation of the camshaft 94.

The through-hole 96 of the camshaft 94 extends into the anvil 126 (e.g., into a bore, inner recess, and/or the like) and opens up to an anvil ball 128 positioned within the anvil 126. The camshaft 94 contacts the anvil ball 128 such that the anvil ball 128 provides a wear contact between the camshaft 94 and the anvil 126 to prevent over-wear to the anvil. In some embodiments, the anvil ball 128 has a diameter of approximately 5.00-15.00 mm. In the illustrated embodiment, the anvil ball 128 has a diameter of approximately 10.00 mm.

With continued reference to FIGS. 2 and 4, the drive assembly 70 further includes a spring 134 biasing the hammer 130 toward the front of the impact wrench 10 (e.g., in the right direction of FIG. 2). In other words, the spring 134 biases the hammer 130 in an axial direction toward the anvil 126, along the axis 54. A forward thrust bearing 138 and a thrust washer 142 are positioned between the spring 134 and the hammer 130. The forward thrust bearing 138 and the thrust washer 142 allow for the spring 134 and the camshaft 94 to continue to rotate relative to the hammer 130 after each impact strike when lugs (not shown) on the hammer 130 engage with corresponding anvil lugs 146 and rotation of the hammer 130 momentarily stops.

As best illustrated in FIG. 4, the camshaft 94 further includes cam grooves 150 in which corresponding cam balls 154 are received. The cam balls 154 are in driving engagement with the hammer 130 and movement of the cam balls 154 within the cam grooves 150 allows for relative axial movement of the hammer 130 along the camshaft 94 when the hammer lugs and the anvil lugs 146 are engaged and the camshaft 94 continues to rotate.

Figure 5:
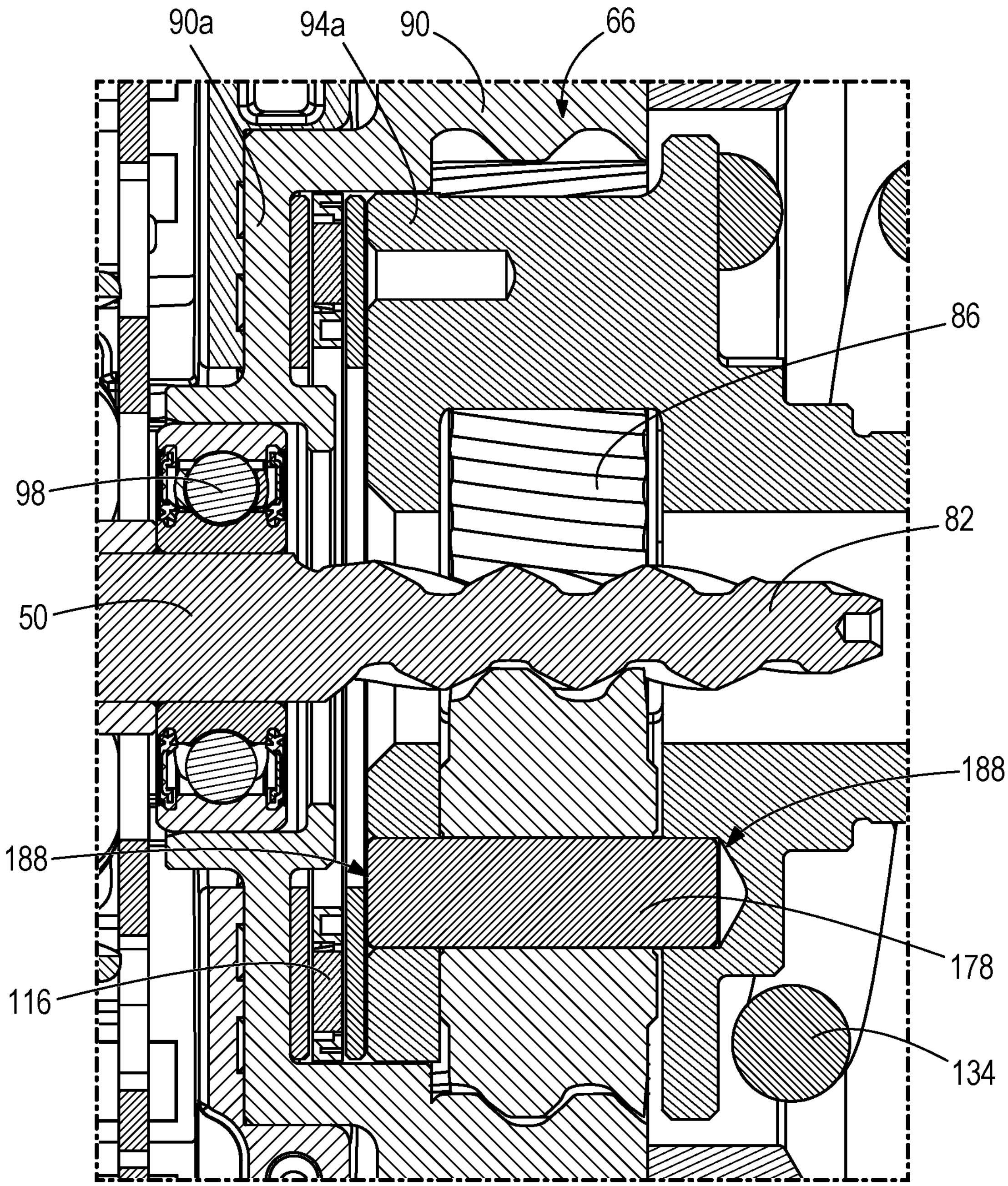
FIG. 5 is an enlarged view of a portion of the cross-sectional view of FIG. 2.
Figure 6:
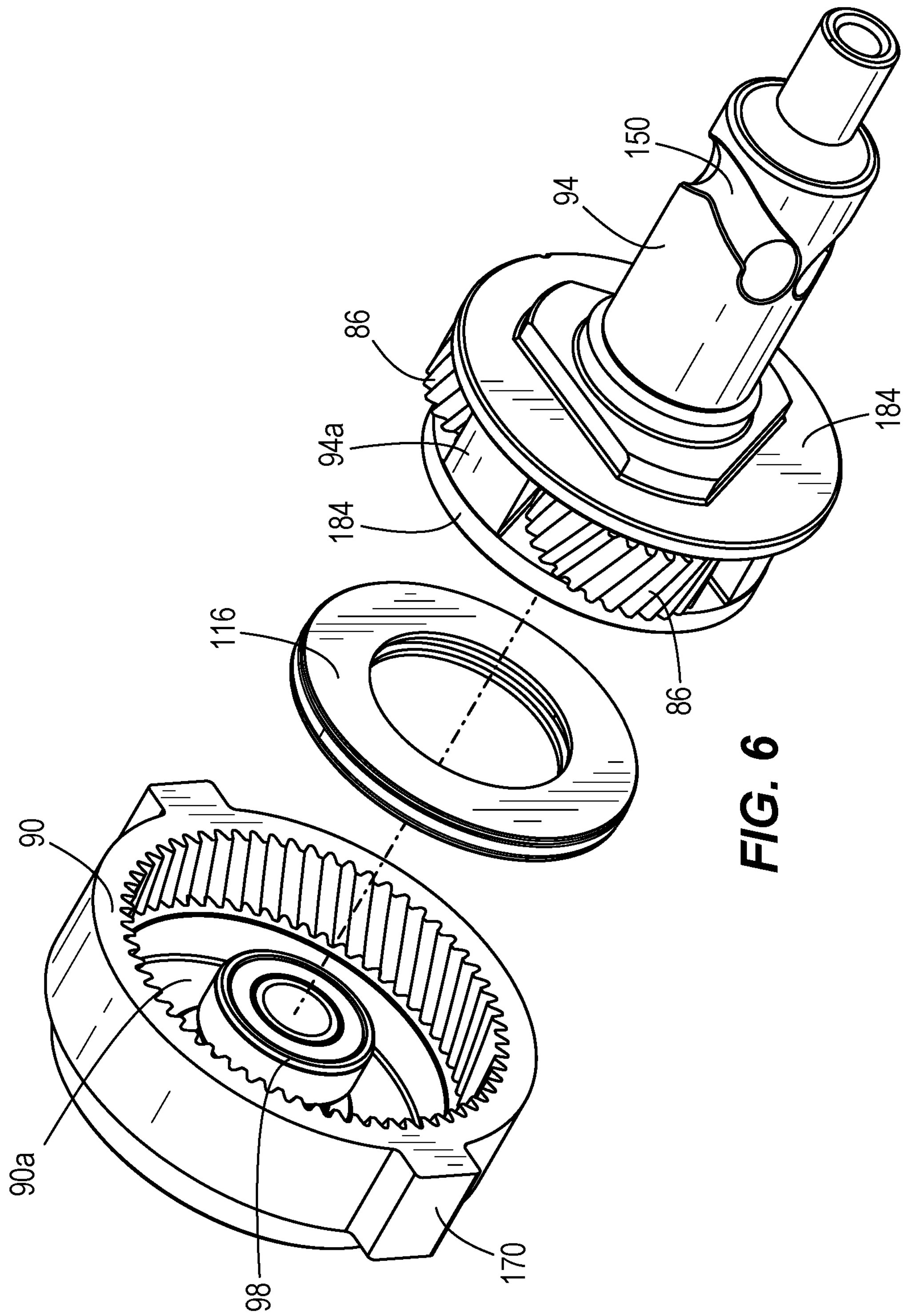
FIG. 6 is an exploded view of a ring gear, a thrust bearing, and camshaft for the impact tool of FIG. 1.

As illustrated in FIGS. 4-6, the impact wrench 10 further includes a camshaft thrust bearing 116. The thrust bearing 116 is supported within the ring gear 90. Specifically, the illustrated thrust bearing 116 is seated against a front side of a rear wall 90*a* of the ring gear 90. The camshaft 94 is against the thrust bearing 116 opposite the rear wall 90*a* of the ring gear 90 such that the thrust bearing 116 is situated between the rear wall 90*a* of the ring gear 90 and the rear end of the camshaft 94. In other embodiments, the thrust bearing 116 may support the camshaft 94 in a different configuration within the impact wrench 10. For example, in some embodiment, the ring gear 90 may be formed as a separate component from the rear gear case. In such embodiments, the thrust bearing 116 may be sandwiched between the camshaft 94 and the rear gear case. In another example, the camshaft 94 may not be formed with the carrier portion 94*a*. In such embodiments, the thrust bearing 116 may be sandwiched between the camshaft 94 and the separately formed carrier portion 94*a*.

Figure 7:
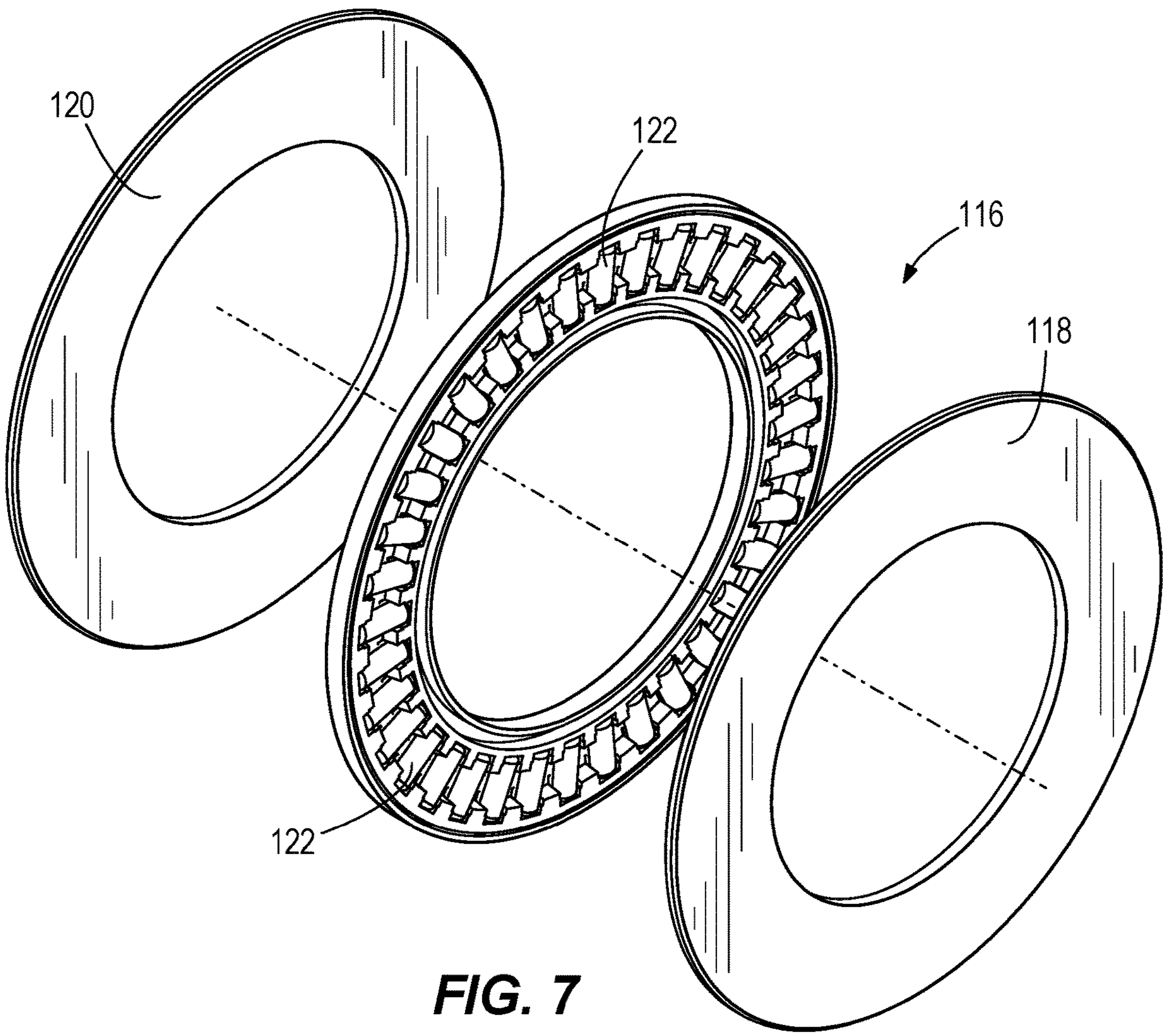
FIG. 7 is an exploded view of the thrust bearing of FIG. 6.

The thrust bearing 116 is configured to receive and support the camshaft 94 (and thus, the planet gears 86 carried by the camshaft 94) against axial forces during operation of the impact wrench 10. As such, the thrust bearing 116 secures the gear assembly 66 against forces transmitted along the axis 54. As illustrated in FIG. 7, the thrust bearing 116 includes a front face 118, a rear face 120, and a plurality of rollers 122 disposed between the front face 118 and the rear face 120. In the illustrated embodiment, the front face 118 and the rear face 120 are washers. The output shaft 50 extends through a central aperture in the thrust bearing 116 to engage the planet gears 86. In some instances, the thrust bearing 116 may not directly touch the rear wall 90*a* of the ring gear 90 and the camshaft 94 such that thrust bearing 116 moves axially back and forth between rear wall 90*a* of the ring gear 90 and the camshaft 94 during operation of the impact wrench 10. In other embodiments, the thrust bearing 116 may not include washers for the front face 118 and the rear face 120 such that the plurality of rollers 122 is disposed directly touching another structure such as, but not limited to, the ring gear 90, the rear gear case, and the camshaft 94. That is, the front face 118 and the rear face 120 may be formed by another structure such as, but not limited to, the ring gear 90, the rear gear case, and the camshaft 94.

With reference to FIGS. 4-6, the planet gears 86 are coupled to carrier portion 94*a* of the camshaft 94 by one or more pins 178, which extend through opposing face plates 184 of the carrier portion 94*a*. In other words, the pins 178 extend through apertures 188 in the opposing face plates 184 of the carrier portion 94*a* such that the planet gears 86 are supported on the pins 178 between the opposite face plates 184. An end of the camshaft 94 opposite from the carrier portion 94*a* is supported by the anvil 126, which is retained in the front housing portion 22 by an anvil bushing 192 (FIG. 2).

In operation of the impact wrench 10, with reference to FIGS. 2 and 4, an operator depresses the switch 62 to activate the motor 42, which continuously drives the gear assembly 66 and the camshaft 94 via the output shaft 50. The helical engagement between the helical pinion 82 and the planet gears 86 may produce forward-directed and rearward-directed thrust loads along the axis 54 of the output shaft 50 (e.g., toward the drive assembly 70), which are transmitted to the rear bearing 102, which is secured against these thrust loads by the bearing retainer 106 and/or housing 14. The thrust bearing 116 provided between camshaft and the ring gear 90 also mitigates thrust loads produced by the helical engagement between the helical pinion 82 and the planet gears 86 to reduce stress on the gear assembly 66 and improve overall performance of the impact wrench 10. During operation of the impact wrench 10, the spring loading of the hammer 130 may produce additional thrust loads along the axis 54. That is, as the camshaft 94 rotates to load the hammer 130 for impact with the anvil lugs 146, the spring 134 may bias the hammer 130 toward the anvil 126. After each impact with the anvil 126, the hammer 130 may retract along the camshaft 94 and compress the spring 134, thereby producing axial loads on the camshaft 94. The thrust bearing 116 bears, or absorbs, this thrust load to improve performance of the impact wrench 10. In particular, the thrust bearing 116 provides for reduced rotational friction on the camshaft 94 under thrust loads (e.g., from the helical gears 82, 86 and the spring 134) compared to impact wrenches having a camshaft axially supported by sliding surfaces, a bushing, or the like. The reduced rotational friction provided by the thrust bearing 116 may result in reduced power consumption, improved battery life, and reduced heat generation within the drive assembly 70.

As the camshaft 94 rotates, the cam balls 154 drive the hammer 130 to co-rotate with the camshaft 94, and the drive surfaces of hammer lugs to engage, respectively, the driven surfaces of anvil lugs 146 to provide an impact and to rotatably drive the anvil 126 and the tool element. After each impact, the hammer 130 moves or slides rearward along the camshaft 94, away from the anvil 126, so that the hammer lugs disengage the anvil lugs 146.

As the hammer 130 moves rearward, the cam balls 154 situated in the respective cam grooves 150 in the camshaft 94 move rearward in the cam grooves 150. The spring 134 stores some of the rearward energy of the hammer 130 to provide a return mechanism for the hammer 130. After the hammer lugs disengage the respective anvil lugs 146, the hammer 130 continues to rotate and moves or slides forwardly, toward the anvil 126, as the spring 134 releases its stored energy, until the drive surfaces of the hammer lugs re-engage the driven surfaces of the anvil lugs 146 to cause another impact.

Various features of the disclosure are set forth in the following claims.

The invention claimed is:

1. A rotary impact tool comprising:

a housing;

a motor supported within the housing, the motor including a shaft configured to rotate about an axis;

a gear assembly operably coupled to the motor, the gear assembly including a ring gear fixed relative to the housing and a plurality of planet gears meshed with the ring gear;

a drive assembly configured to convert continuous torque received from the shaft through the gear assembly into periodic rotational impacts upon a workpiece, the drive assembly including a camshaft operably coupled to the gear assembly, an anvil positioned adjacent to a forward end of the camshaft, and a hammer configured to reciprocate along the camshaft to impart periodic rotational impacts to the anvil in response to rotation of the camshaft; and a thrust bearing engaged with the camshaft such that the thrust bearing is configured to at least partially support the camshaft in an axial direction.

2. The rotary impact tool of claim 1, wherein the camshaft includes a rear end, and wherein the thrust bearing is engaged with the camshaft at the rear end of the camshaft.

3. The rotary impact tool of claim 2, wherein the thrust bearing is disposed along the axis between the ring gear and the camshaft.

4. The rotary impact tool of claim 3, wherein the thrust bearing is supported within the ring gear against a rear wall of the ring gear.

5. The rotary impact tool of claim 1, wherein the thrust bearing includes a first face, a second face, and a plurality of rollers disposed between the first face and the second face.

6. The rotary impact tool of claim 1, wherein the shaft includes a helical pinion that engages the planet gears and is configured to produce a thrust load on the camshaft, and wherein the thrust bearing is configured to support the camshaft against the thrust load.

7. The rotary impact tool of claim 1, wherein the camshaft includes a carrier portion that supports the plurality of planet gears between opposing face plates, and wherein the thrust bearing is engaged with the camshaft at one of the opposing face plates.

8. The rotary impact tool of claim 7, wherein the one of the opposing face plates is a rearward face plate positioned on a rearward side of the planet gears.

9. The rotary impact tool of claim 1, further comprising a rear radial bearing and a forward radial bearing rotatably supporting the shaft, wherein the forward radial bearing is supported by the ring gear.

10. A rotary impact tool comprising:

a housing;

a motor supported within the housing, the motor including a shaft configured to rotate about an axis;

a gear assembly operably coupled to the motor, the gear assembly including a ring gear fixed relative to the housing and a plurality of planet gears meshed with the ring gear and rotationally engaged with the shaft such that the motor is configured to drive rotation of the planet gears around the ring gear via the shaft;

a camshaft including a carrier portion that supports the planet gears such that the camshaft is configured to rotate with the planet gears about the axis; and a thrust bearing positioned between the camshaft and the ring gear.

11. The rotary impact tool of claim 10, wherein the thrust bearing is positioned between a rear wall of the ring gear and a rear plate of the carrier portion of the camshaft.

12. The rotary impact tool of claim 10, further comprising a hammer coupled to the camshaft and configured to reciprocate along the camshaft, and wherein the thrust bearing is configured to support the camshaft against axial loads generated due to reciprocation of the hammer.

13. The rotary impact tool of claim 10, wherein the thrust bearing includes a plurality of rollers.

14. The rotary impact tool of claim 10, wherein the shaft extends through the thrust bearing.

15. A rotary impact tool comprising:

a housing;

a motor supported within the housing, the motor including a shaft configured to rotate about an axis;

a gear assembly operably coupled to the motor; and a drive assembly configured to convert continuous torque received from the shaft through the gear assembly into periodic rotational impacts upon a workpiece, the drive assembly including a camshaft operably coupled to the gear assembly, an anvil, a hammer spring, and a hammer configured to reciprocate along the camshaft to impart rotational impacts to the anvil in response to rotation of the camshaft, wherein movement of the hammer produces an axial load on the camshaft; and a thrust bearing supporting the camshaft such that at least a portion of the axial load on the camshaft is transmitted through the thrust bearing.

16. The rotary impact tool of claim 15, wherein the gear assembly includes a ring gear, and wherein the thrust bearing is disposed along the axis between the ring gear and the camshaft.

17. The rotary impact tool of claim 15, wherein the thrust bearing includes a first face, a second face, and a plurality of rollers disposed between the first face and the second face.

18. The rotary impact tool of claim 15, wherein the gear assembly includes a plurality of planet gears at least partially engaged with a portion of the shaft, and wherein the camshaft includes a carrier portion that supports the plurality of planet gears and couples the camshaft for rotation with the plurality of planet gears.

19. The rotary impact tool of claim 18, wherein the carrier portion includes opposing face plates and the plurality of planet gears is positioned between the opposing face plates, wherein an end of the hammer spring engages one of the opposing face plates, and wherein the other of the opposing face plates engages the thrust bearing.

20. The rotary impact tool of claim 15, further comprising a rear radial bearing and a forward radial bearing rotatably supporting the shaft, wherein the shaft extends through the thrust bearing.

* * * * *